United States Patent [19]

O'Farrell

[11] 4,323,439
[45] Apr. 6, 1982

[54] METHOD AND APPARATUS FOR DYNAMIC EQUILIBRIUM ELECTROPHORESIS

[75] Inventor: Patrick H. O'Farrell, San Francisco, Calif.

[73] Assignee: The Regents of the University of California, Berkeley, Calif.

[21] Appl. No.: 109,003

[22] Filed: Dec. 31, 1979

[51] Int. Cl.³ .............................................. B01D 57/02
[52] U.S. Cl. ............................. 204/180 G; 204/299 R
[58] Field of Search ............ 204/180 R, 180 G, 299 R

[56] References Cited

U.S. PATENT DOCUMENTS

| Re. 27,552 | 1/1973 | Allington | 204/180 R X |
|---|---|---|---|
| 2,566,308 | 9/1951 | Brewer | 204/180 R |
| 3,346,479 | 10/1967 | Natelson | 204/180 G X |
| 3,384,564 | 5/1968 | Ornstein et al. | 204/180 R |
| 3,582,475 | 6/1971 | Pretorius et al. | 204/180 G X |
| 3,594,294 | 7/1971 | Pretorius et al. | 204/180 G |
| 3,640,813 | 2/1972 | Nerenberg | 204/180 G X |
| 3,704,217 | 11/1972 | Nerenberg | 204/180 G |
| 3,705,845 | 12/1972 | Everaents | 204/180 R |
| 3,791,950 | 2/1974 | Allington | 204/180 R |
| 3,844,925 | 10/1974 | Stathakos | 204/180 G X |
| 3,847,785 | 11/1974 | Allington | 204/299 R |
| 3,962,058 | 6/1976 | Denckla | 204/180 R |
| 3,969,218 | 7/1976 | Scott | 204/180 G X |
| 4,090,937 | 5/1978 | Stoev et al. | 204/299 R |
| 4,148,703 | 4/1979 | Trop et al. | 204/180 G |

OTHER PUBLICATIONS

Ravoo, Gellings and Vernculen, *Anal. Chims. Acta*, 38 (1967), pp. 219–232.
Martin et al., "Displacement Electrophoresis", *Anal. Chem. Acta*, vol. 38, 1967, pp. 233–237.

*Primary Examiner*—Arthur C. Prescott
*Attorney, Agent, or Firm*—Townsend and Townsend

[57] ABSTRACT

Novel method and apparatus for separating, purifying and/or concentrating ions in a mixture of different molecular species using a method of electrophoresis in the presence of a counterflowing carrier fluid are provided. By selecting the appropriate carrier fluid flow rate, magnitude of the current and varying separation characteristics in a separation chamber, one or more similarly charged species of ions can be segregated into separate or discrete equilibrium zones within the chamber.

26 Claims, 11 Drawing Figures

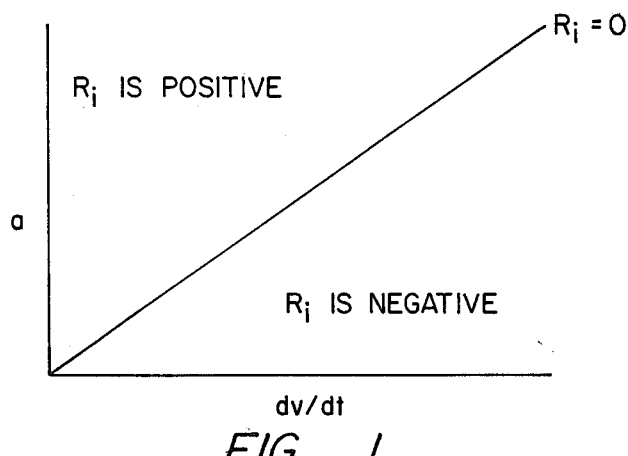
FIG._1.
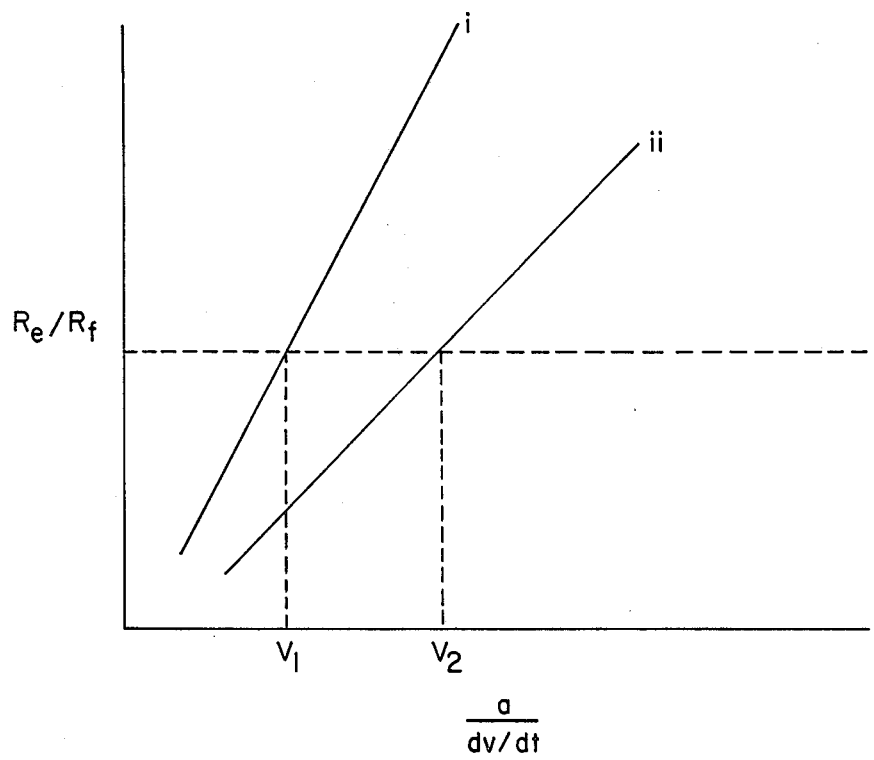
FIG._1A.

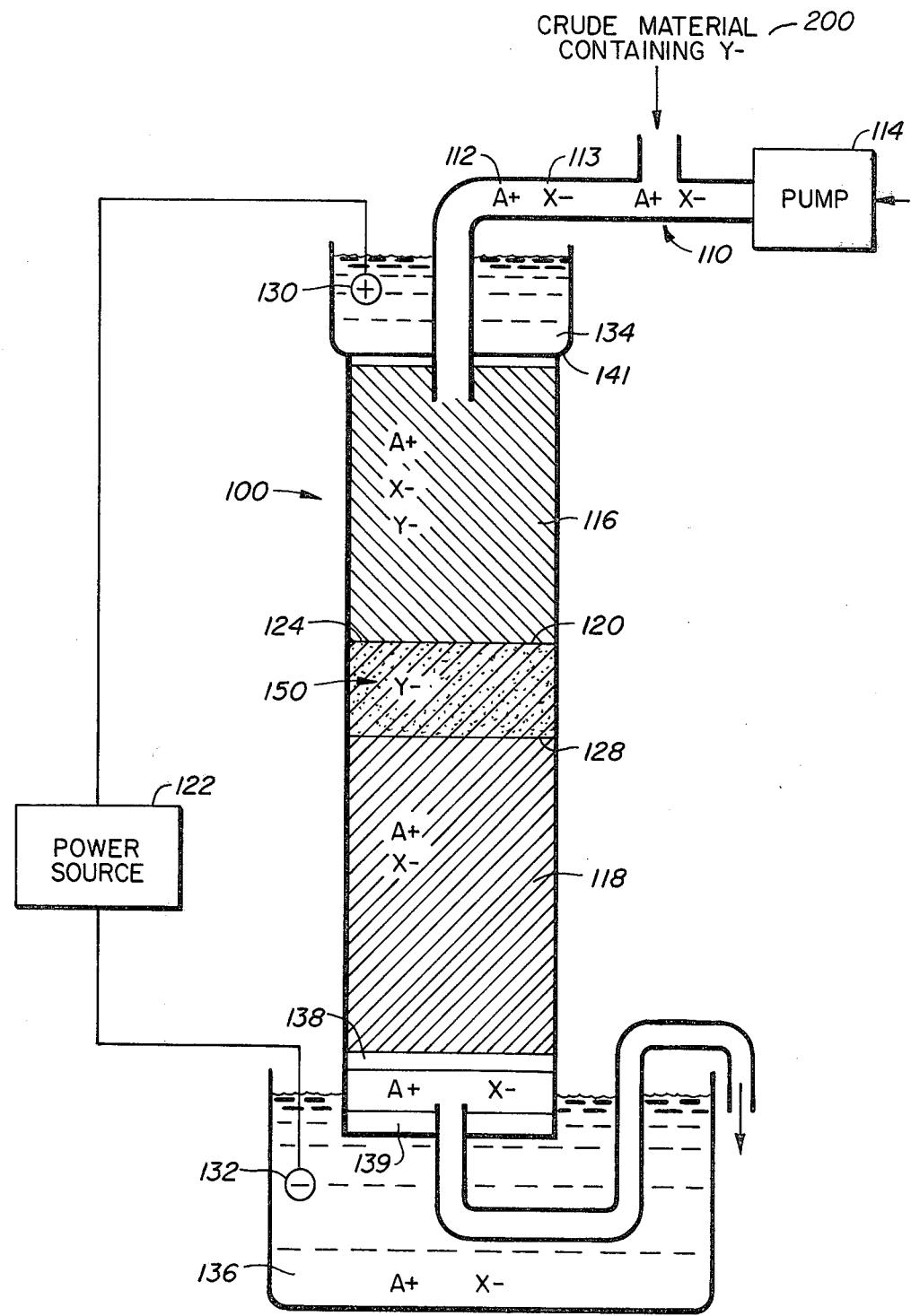
FIG._2.

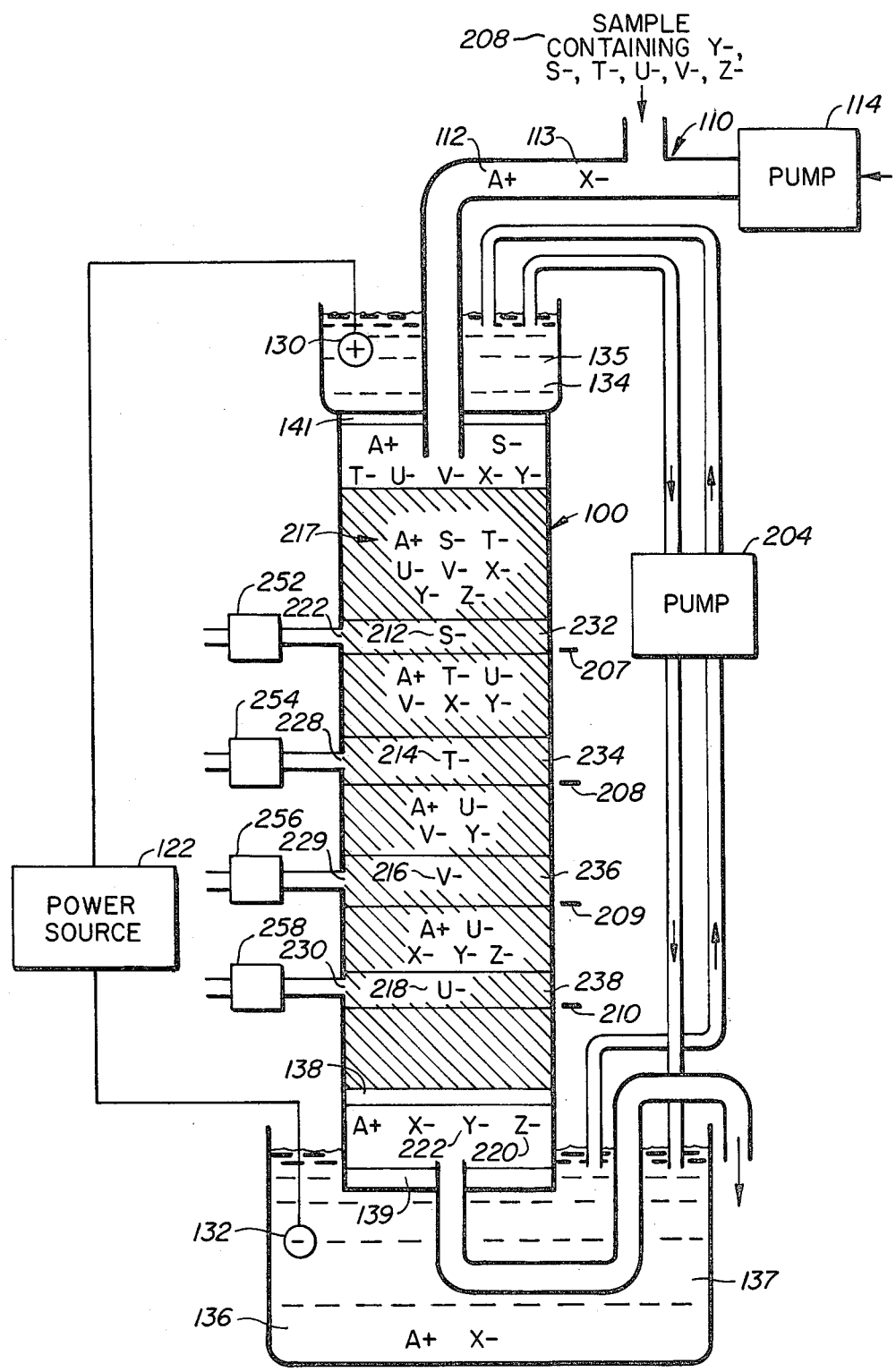
FIG._3.

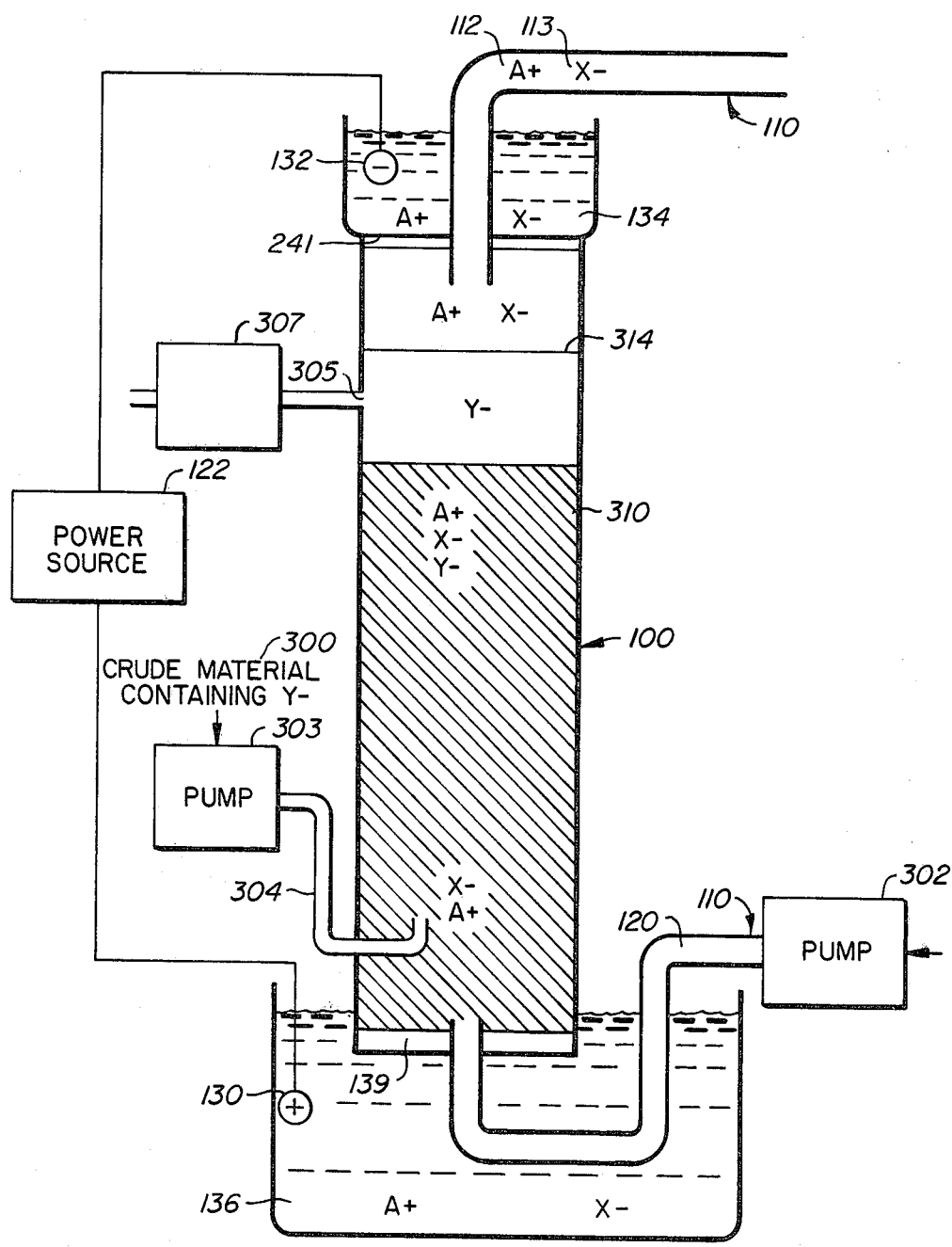
FIG._4.

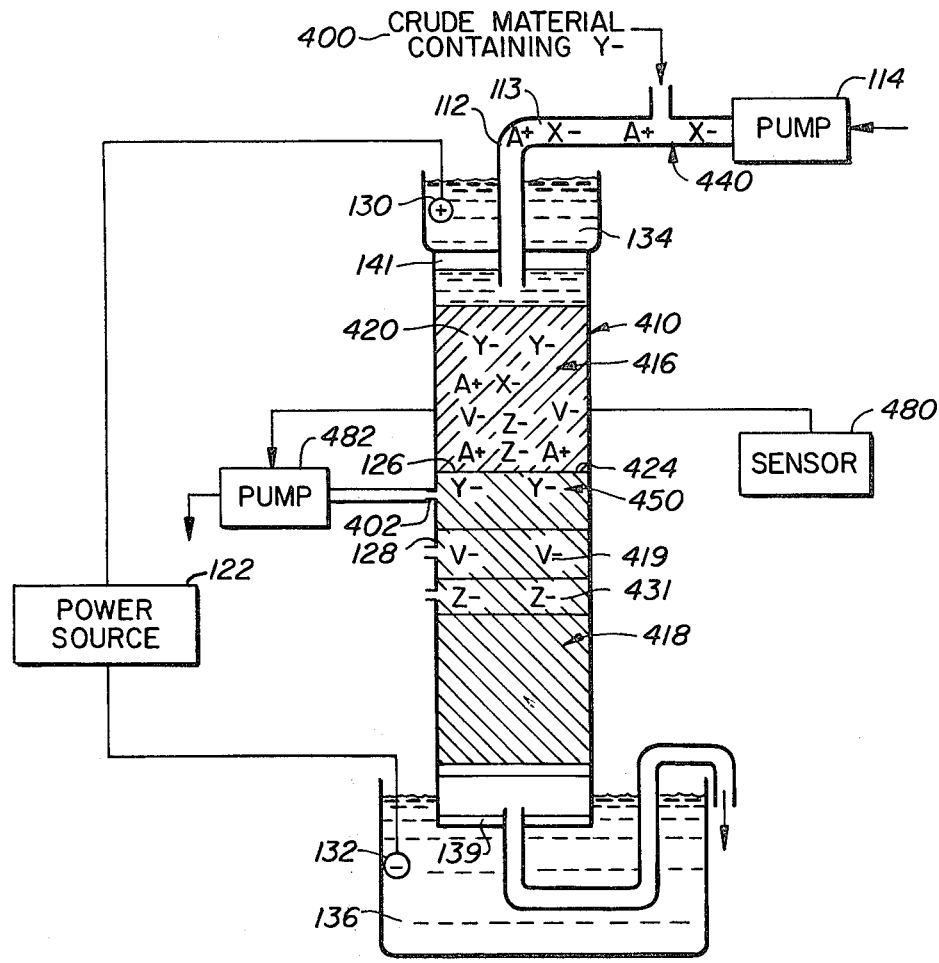
FIG._5.
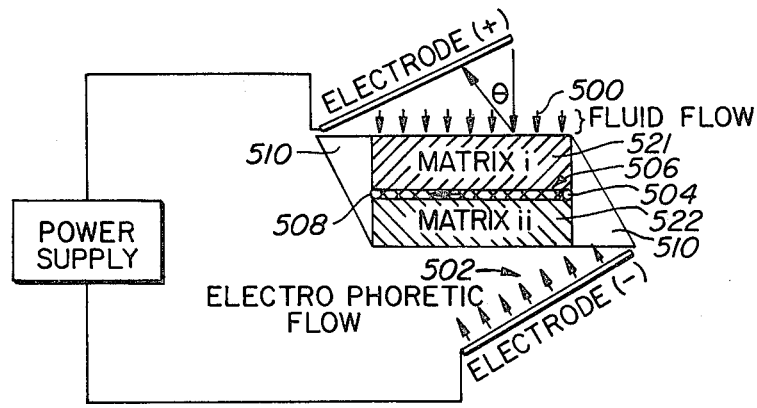
FIG._6.

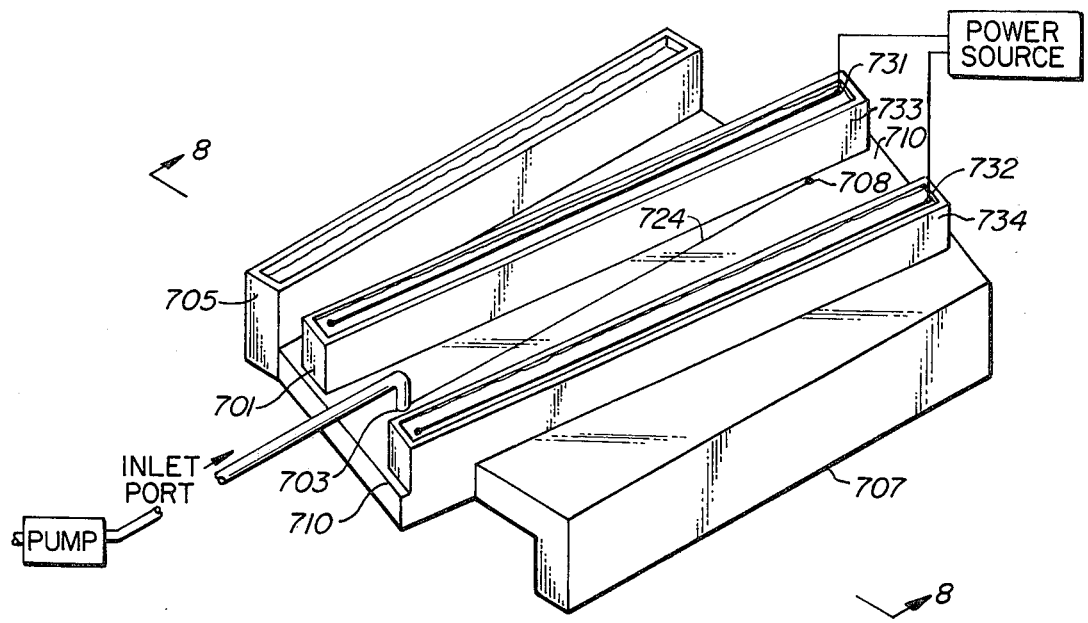
FIG._7.
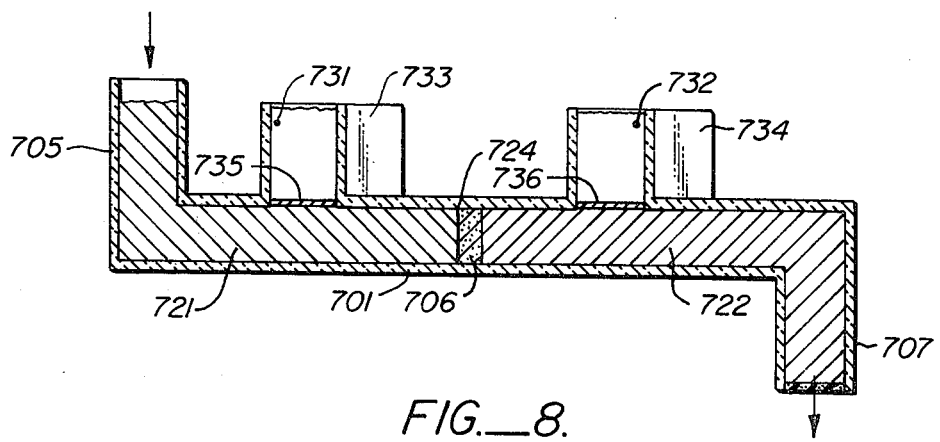
FIG._8.

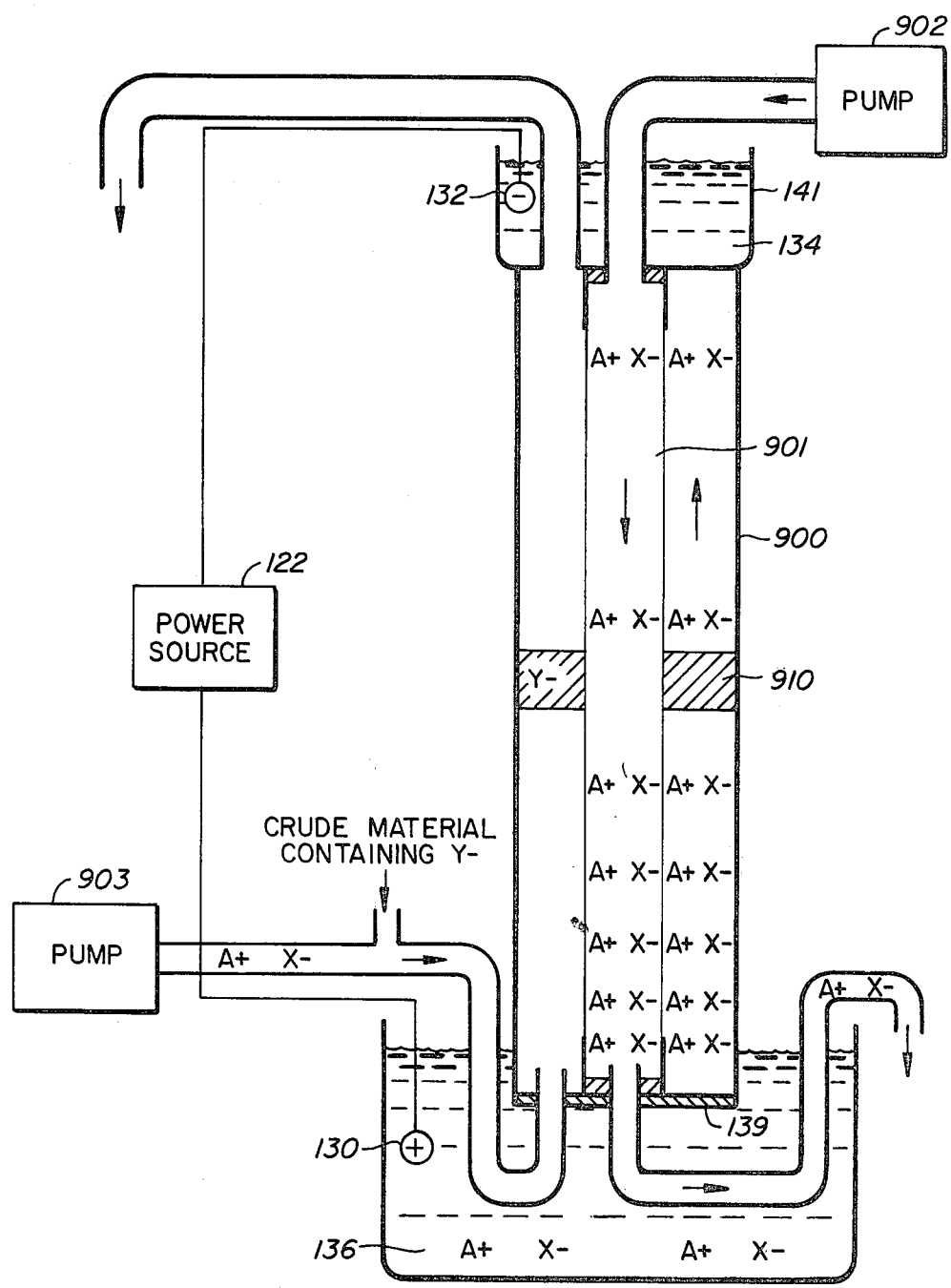
FIG._9.

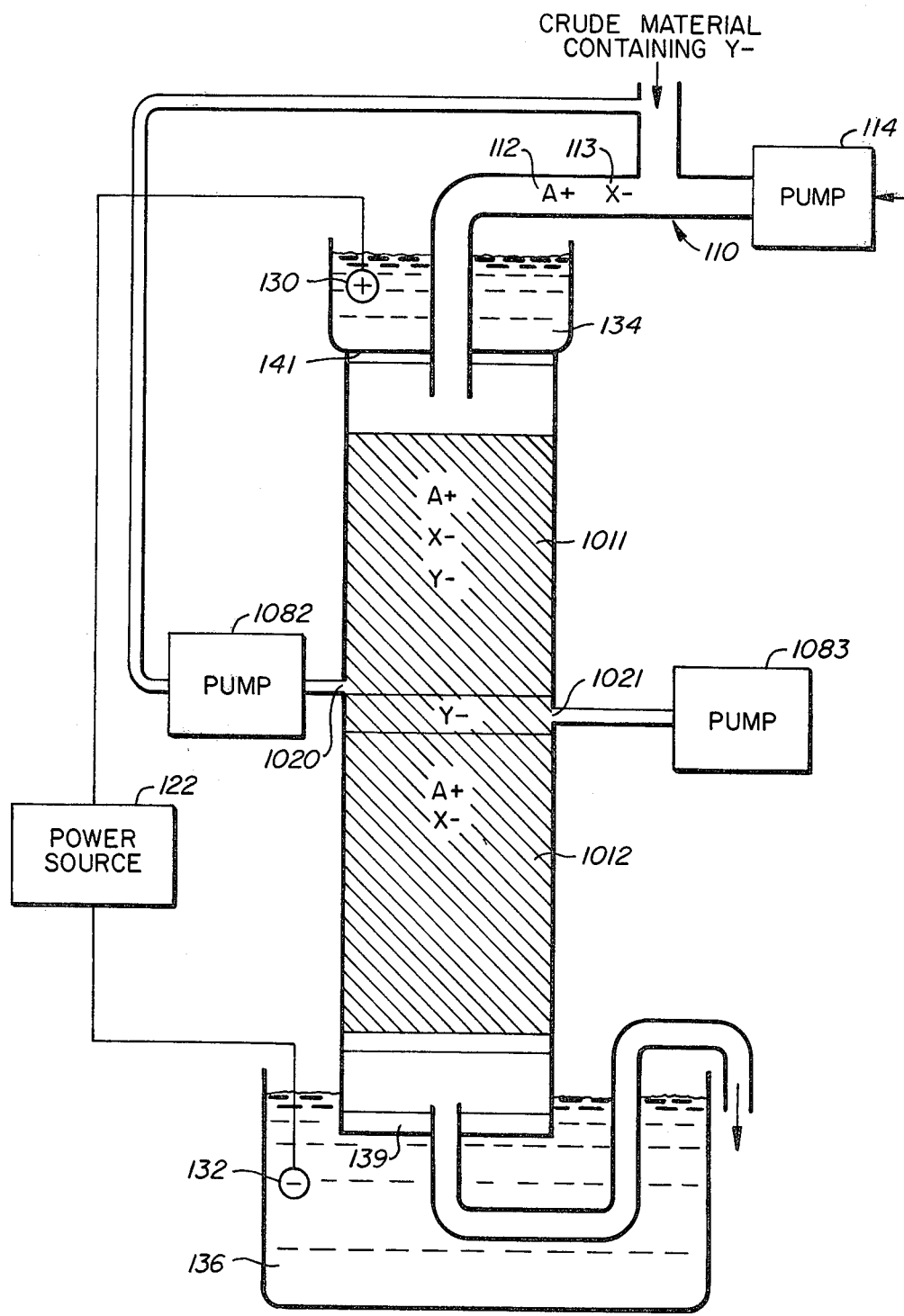
FIG._10.

METHOD AND APPARATUS FOR DYNAMIC EQUILIBRIUM ELECTROPHORESIS

BACKGROUND OF THE INVENTION

1. Field of Invention

This invention relates to methods and apparatuses for segregating, i.e. separating, purifying and/or concentrating ions in a mixture of different molecular species. More particularly, this invention relates to a combination of electrophoresis and a flowing carrier fluid.

2. Brief Description of the Prior Art

The principles of electrophoresis are known whereby separation of a mixture of ions can be effected by an applied voltage field since different species will migrate toward an oppositely charged electrode at different rates proportional to their charge to mass ratio. It is also known that particular hydrated supports or matrices can have an influence on electrophoresis rates and can be used in conjunction with electrophoresis to effect the separation of ions according to physical properties other than their charge to mass ratio. In addition, a specialized technique is known, in which an electric potential forces complex polyionic molecules to their isoelectric point in a pH gradient.

Electrophoresis is typically used as an analytical tool in biochemical research. When used in this manner, electrophoresis separates components of a mixture and allows certain measurements, e.g. quantification, of the separated components. Usually analytical electrophoresis methods do not include the recovery of the separated components, i.e. the species are both separated and measured in the separation medium and the separated components are recovered only as a mixture or not at all. Several electrophoretic techniques have been developed for preparative use, i.e. to recover the separated components. The simplest of the preparative electrophoresis systems operates on the same principles as the analytical methods, wherein a zone containing a mixture of ion species is applied at the origin and the ions are electrophoresed into or through a supporting matrix whose major importance is to prevent turbulent mixing, i.e. as an anticonvection medium. These techniques include a method for recovering the different ions which are separated by virtue of differing rates of electrophoresis through the supporting matrix. U.S. Pat. No. 3,847,785 is illustrative of such techniques.

These techniques are extremely limited in that they have a very low capacity. Further, because electrophoresis cannot be done at high concentrations of ionic components and because electric heating limits the size of the apparatus, such techniques cannot advantageously be operated on a large scale basis. Moreover, the sample must be in a concentrated form, while recovered isolated components are generally very dilute. Finally, such techniques have the added disadvantage of very limited resolution, i.e. poor capacity to separate two or more very similar components.

Methods of continuous electrophoresis are known in which electrically charged species are continuously fed into an apparatus and are segregated by application of a direct current perpendicular to the flow of a carrier solution. Each charged component moves in a particular direction defined by its rate of electrophoresis in one direction and the rate at which it is carried by the bulk solution flow in the perpendicular direction. Components can thus be collected continuously from the position of zones on the downstream end of the apparatus (see e.g. Ravoo, Gellings and Vermeulen, Anal. Chim. Acta 38 (1967) 219-232). By virtue of allowing continuous operation, these techniques have increased the capacity of electrophoretic techniques. However, despite this increase, the capacity is still low, while the other disadvantages of electrophoresis, e.g. poor resolution, remain. Additionally, these continuous electrophoresis processes cannot be adapted to very large scale operation because of inadequate heat dissipation.

Also known is a mode of electrophoresis referred to as isotachophoresis or displacement electrophoresis which was developed following the principles described by Ornstein in U.S. Pat. No. 3,384,564. According to these principles, under particular conditions, an ion of intermediate electrophoretic mobility can be "sandwiched" between an ion with higher electrophoretic mobility and one of lower electrophoretic mobility. Isotachophoresis has the advantage of providing a force which counteracts diffusion and also can concentrate the separated components. However, several problems have been encountered in attempts to apply the method of isotachophoresis. In the absence of spacer ions, the different separated zones of a mixture border on each other and are thus difficult to recover without contamination from adjacent components. Spacer ions must possess very particular properties and thus are not always available. To obtain adequate separation the components must be electrophoresed a considerable distance which demands a high voltage. Also isotachophoresis has a limited capacity.

A method has been described (Preetz and Pfeifer, Anal. Chim. Acta 38 (1967) 255-260) in which bulk fluid flow counteracts isotachophoresis. The purpose of this counter flow is that isotachophoresis can continue for a long time in a small chamber or column. This decreases the power requirements as disclosed in U.S. Pat. No. 3,705,845. Furthermore, bulk fluid flow perpendicular to direction of isotachophoresis has been used to give a continuous method analogous to that described for electrophoresis above.

SUMMARY OF THE INVENTION

The invention comprises a novel method and apparatus for isolating, purifying and/or concentrating any charged species, i.e., any atom, molecule, compound or particle which possesses ionic character (ions).

The processes of the present invention comprise a combination of electrophoresis, a counter flowing carrier fluid and a separation chamber having longitudinally varying separation characteristics. According to the present invention by selecting the appropriate carrier fluid flow rate, the magnitude of the applied electric field, i.e. the current, and the varying separation characteristics in the separation chamber, one or more similarly charged species of ions can be segregated into separate or discrete equilibrium zones within the chamber.

The process of the present invention is based on the simple principle that the movement of a given ion can be in the direction of flow or in the direction of electrophoresis and that due to the varying separation characteristics movement due to flow can dominate in one compartment of the separation chamber and movement due to electrophoresis can dominate in a second compartment. Thus, conditions can be selected such that a given ion will move toward the boundary of two compartments. By compartments is meant a portion or region of the separation chamber possessing a unique combination of separation characteristics.

The longitudinal variation in separation characteristics can be achieved by several methods. In one type of embodiment each compartment is defined by a unique matrix or particular combination of matrices (granular or porous materials through which a solvent can flow) which by virtue of interactions with ions within the separation chamber establish particular separation characteristics. In a second type of embodiment the electrical potential (voltage) across different compartments of the separation chamber differs. In a third type of embodiment the rate of fluid flow through different compartments differs. The first of the above methods (that using one or more matrices) is particularly practical for large scale applications and is described in detail below.

The method of the present invention proceeds by introducing a sample of a mixture of different molecular species into a separation chamber having longitudinally varying separation characteristics in the form of at least two compartments, flowing a carrier fluid through the chamber and applying an electric field across the chamber such that the ions to be separated or collected electrophorese in a direction counter to the flow of the carrier fluid. Typically, one compartment will comprise a uniform support matrix or a volume of free flowing carrier fluid. Alternatively, a non-uniform or gradient support matrix may be utilized, such matrix providing a multiplicity of compartments. The flow rate and the electric field strength are selected so that the species to be separated have a net mobility of substantially zero at some position in the chamber, e.g. in two contiguous compartments the ions move toward the common boundary and have a net mobility of zero in an equilibrium zone at and adjacent the boundary.

In one embodiment, one compartment of the separation system comprises a matrix of a type in which, at suitable flow rates and applied voltages, i.e., current, the movement of the species of desired ions due to electrophoresis is slightly faster than their movement due to flow in the opposite direction, i.e. the ions migrate slightly faster in the direction of electrophoresis than in the opposite carrier fluid flow direction. A compartment of the separation system contiguous to the first in the direction of electrophoresis comprises a second matrix in which the desired ions move due to flow slightly faster than they move due to electrophoresis. Under the appropriate flow rate and applied voltage, the result of the imbalances in the movements due to electrophoresis and due to flow is that the desired ions migrate to the common boundary of the two compartments, i.e. of the two matrices, and are concentrated there in a discrete equilibrium zone while impurities are washed through the system.

The separation system of the present invention provides a high resolution method for purifying desired ions and, importantly, can be used for large scale amounts and/or on a continuous basis, while providing relatively comparably high resolution coupled with high capacity and sufficient flexibility to be generally applicable for a wide range of separation requirements.

BRIEF DESCRIPTION OF THE DRAWINGS

FIG. 1 is a graph depicting the direction and rate of net movement (Ri) of an ion as a function of the current (a) and flow rate (dv/dt).

FIG. 1A is a graph depicting the direction of net movement of an ion as a function of the ratio a:dv/dt on a particular matrix.

FIG. 2 is a fragmentary, elevational, sectional view, taken along a vertical axis of an electrophoresis apparatus that includes an embodiment of the invention which utilizes two uniform support matrices;

FIG. 3 is a fragmentary, elevational, sectional view, taken along a vertical axis of an electrophoresis apparatus that includes another embodiment of the invention which utilizes a gradient support matrix;

FIG. 4 is an elevational, sectional view taken along a vertical axis of an apparatus according to another embodiment of the present invention which utilizes a single uniform support matrix;

FIG. 5 is an elevational, sectional view, taken along a vertical axis of an apparatus according to another embodiment of the present invention;

FIG. 6 is a schematic representation of another embodiment;

FIG. 7 is a perspective view of an embodiment of the FIG. 6;

FIG. 8 is a cross-sectional view of the embodiment depicted in FIG. 7 taken along line 8—8;

FIG. 9 is a fragmentary, elevational, sectional view, taken along a vertical axis of an electrophoresis apparatus that includes one embodiment of the invention;

FIG. 10 is a fragmentary, elevational, sectional view, taken along a vertical axis of an electrophoresis apparatus that includes one embodiment of the invention.

DESCRIPTION OF THE PREFERRED EMBODIMENT

Ions in solution or suspension will migrate in an electric field at a rate $R_e$ (distance traversed per unit time) determined by (a) the electrical current, a, (amperes); (b) the electrical resistance of the carrier fluid, r; (c) the reciprocal of the cross sectional area of the chamber, $1/A$; (d) the influence of the separation medium on electrical resistance, Ce; (e) the electrophoretic mobility Me of the ion (proportional to the total charge of the ion and inversely proportional to its total molecular weight); and (f) by physical characteristics of the medium through which the ions must migrate, usually expressed as $k_e$ (the factor by which a particular medium influences the electrophoretic mobility of a particular ion). The rate of movement due to electrophoresis $R_e$ is represented by the formula:

$$R_e = a \cdot r \cdot 1/A \cdot Ce \cdot Me \cdot k_e \tag{1}$$

Similarly, the ions in solution or suspension will move, when the carrier fluid is made to flow, at a rate, $R_f$ (distance traversed per unit time), determined by (a) the rate of flow of the entire solution, $dv/dt \cdot 1/A$ (the volume of solution flowing past a point over the time interval dt divided by the cross sectional area, A, of flow) and (b) the physical characteristics of the medium through which the ions must move, $k_f$ (the degree to which a particular medium influences the movement due to flow of a particular ion). The movement due to flow $R_f$ is represented by the formula:

$$R_f = dv/dt \cdot 1/A \cdot k_f \tag{2}$$

In the process of the present invention, the movement of a given ion due to electrophoresis is counterbalanced by its movement due to flow in the opposite direction.

The terms r, 1/A, Ce, Me, $k_e$ and $k_f$ are referred to as separation characteristics. The terms Ce, $k_e$ and $k_f$ are also referred to as medium characteristics. In addition, in accordance with the principles described below, the present invention provides a separation chamber with varying separation characteristics, i.e. divides the separation chamber into different compartments or regions, and produces an equilibrium force by taking advantage of the fact that differing separation characteristics, e.g., matrices with different medium characteristics, can have different influences on the rate of electrophoresis ($R_e$) and on the rate of flow ($R_f$), e.g. by utilizing two matrices which have different values for $k_e$, Ce and $k_f$.

As can be seen from formula (1) the rate of movement due to electrophoresis, $R_e$, can be varied independently by varying the applied voltage, i.e. regulating the amount of electrical current, a, put through the separation chamber. Similarly, in formula (2) the rate of movement due to flow, $R_f$, can be independently varied by varying the rate of carrier fluid flow, dv/dt. The dependence of $R_e$ on the current, a, is linear if other parameters are constant, i.e. the ion species and the separation characteristics. Similarly, the dependence of $R_f$ on the rate of flow of the carrier fluid is linear when other parameters are constant, i.e. the separation characteristics, the chamber cross-sectional area, the ion species and the carrier fluid.

In each compartment n=i, ii, iii, etc. a given ion will have a net mobility $R_n$ equal to the sum of its rate of movement due to electrophoresis, $R_e$ (defined as in the positive direction) and its rate of movement due to flow, $R_f$. For example, in compartment i the net mobility $R_i$ is equal to $R_e - R_f$ (minus because flow and electrophoresis are counterdirectional). If movement due to electrophoresis dominates then $R_i$ is positive while if movement due to flow dominates $R_i$ is negative. Since both $R_e$ and $R_f$ can be adjusted independently, $R_i$ can be made to be positive, zero or negative (FIG. 1).

An alternate way of expressing this is, if $R_i$ is positive, then $R_e:R_f > 1$, if $R_i$ is negative, $R_e:R_f < 1$, and if $R_i$ is zero then $R_e:R_f = 1$. This absolute ratio of $|R_e:R_f|$ varies in proportion to the ratio of a:dv/dt, as depicted in FIG. 1A. The direction of net movement of an ion is dependent on the separation characteristics, as well as on the ratio of a:dv/dt. Where two matrices are selected which do not have the same $k_e$, Ce and $k_f$, a given ion will have a different net mobility, $R_n$, in the different matrices in the separation chamber despite the same values of a and dv/dt. Thus in FIG. 1A two curves are given: one for a matrix i and one for a matrix ii.

Typically, when two matrices are used in one separation chamber, the same electric current and the flowing solvent pass through both matrices. (Note that in some embodiments, such as that depicted in FIG. 9, the same electric current and same carrier fluid do not pass through all compartments of the separation chamber). Thus, although a:dv/dt can be varied, it typically will only have one value at a time for one separation chamber and thus is the same for all compartments of the chamber, e.g. matrix i and matrix ii. It can be seen from FIG. 1A, at all values of a:dv/dt between $V_1$ and $V_2$, the net mobility of the given ion will be in opposite directions in matrix i and matrix ii. Thus, if the two matrices are positioned such that the matrix in which the net mobility is negative is placed contiguous to and in the direction of electrophoresis with respect to the matrix in which the net mobility is positive, then the ion will migrate toward the common boundary of the two matrices. The ion will concentrate adjacent the boundary of these matrices and will form an equilibrium zone. An equilibrium zone is defined as that region of the separation chamber in which a particular species is concentrated and has a net longitudinal movement of substantially zero. The details of the conditions within the equilibrium zone are described below (section entitled: Equilibrium Zones).

FIG. 2 depicts one embodiment of the present invention in which two compartments or regions comprising two different matrices 116, 118 are utilized to produce longitudinally varying medium characteristics in a separation chamber 100. The medium characteristics, applied voltage and rate of carrier fluid flow produce dynamic equilibrium conditions for given preselected $Y^-$ ions 120. By dynamic equilibrium conditions for a species of ion is meant conditions in a separation system the effect of which is that a particular species of ion remains stationary at the position in the system where those conditions exist, i.e. the ion concentrates in an equilibrium zone. Any pump 114 capable of maintaining a constant output may be utilized to pump the carrier fluid through the separation chamber 100. The pumping rate chosen is as dictated by the separation requirements. That is, the movement due to flow (equation 2) is proportional to the pumping rate which can be selected to give dynamic equilibrium conditions for the desired ions.

The separation chamber 100 can be of almost any form as demanded by the particular separation technique. Although simple changes in the shape of a separation chamber can produce gradients in the voltage field and fluid flow rates, it should be noted that these trivial changes cause parallel changes in both the rates of movement due to flow and movement due to electrophoresis and do not produce the variation in the ratio of these rates required to implement the present invention. The material contacting the solution 110 is typically a non-conductor of electricity. The chamber 100 is usually closed, except for exit ports which may be disposed at any point along the chamber 100 for convenient removal of desired ions at their position of dynamic equilibrium, i.e. at the position of about zero net mobility. The chamber 100 is impermeable to the solution 110 so that constant fluid flow can be maintained. A preferred separation chamber 100 is a vertical cylindrical chamber (column), typically of glass or suitable plastic. A transverse disc or mesh 138 at the bottom of the column 100 supports the matrices 116, 118 which longitudinally fill the cavity of the column 100. This disc 138 allows the carrier fluid to flow and ions to move. Preferably, the electrodes 130, 132 are isolated from the separation chamber 100 by having the electrodes 130, 132 contact the solution 110 in reservoirs 134, 136 which are connected to the separation chamber 100 by a liquid contact 139, 141 such as a membrane barrier or matrix (different from the support matrices discussed above) which resists fluid flow but does not resist the electric current flow, i.e. the flow of ions, through the solution.

A carrier fluid 110 containing $A^+$ ions 112 and $X^-$ ions 113 pumped by a pump 114 flows down through a first support matrix 116 of type i, then through a second support matrix 118 of type ii. Under the configurations depicted in FIG. 2 matrix i 116 is positioned above matrix ii 118, the movement of $Y^{31}$ ions 120 due to flow is downward, and the movement of $Y^{31}$ ions 120 due to electrophoresis is upward. In this embodiment the matrices i, ii are chosen such that $Ce \cdot k_e/k_f$ for matrix i 116 differs from $Ce \cdot k_e/k_f$ for matrix ii 118. As an example, in a matrix i having $Ce_i \cdot k_{ei}$ equal to $Ce_{ii} \cdot k_{eii}$ of matrix ii, and having a $k_{fi}$ to twice that for matrix ii ($k_{fii}$), the electrophoresis rate of $Y^-$ ion 120 is the same in matrix i 116 and matrix ii 118 ($R_{ei} = a \cdot r \cdot 1/A \cdot Ce_i \cdot Me \cdot k_{ei} = R_{eii} = a \cdot r \cdot 1/A \cdot Ce_{ii} \cdot Me \cdot k_{eii}$). However, the flow mobility of $Y^-$ ion 120 in matrix i 116 ($R_{fi}$) is twice the flow mobility ($R_{fii}$) in matrix ii 118 ($dv/dt \cdot 1/A \cdot k_{fi} = dv/dt \cdot 1/A \cdot 2 \times k_{fii}$). That is, even though the carrier fluid 110 is flowing at the same rate ($dv/dt \cdot 1/A$) in matrix i 116 and ii 118, the $Y^{31}$ ion 120 flows at twice the rate in matrix i 116 ($R_{fi}$) as it does in matrix ii 118 ($R_{fii}$). Thus, when a voltage applied by a power source 122 is chosen so that the electrophoresis rate for $Y^-$ ion 120 in both matrices (since $R_{ei} = R_{eii}$) is less than $R_{fi}$ but greater than $R_{fii}$ ($R_{fi} > a \cdot r \cdot 1/A \cdot Ce \cdot Me \cdot k_e > R_{fii}$), then the movements of $Y^-$ ions 120 due to electrophoresis and due to flow are imbalanced in both support matix i 116 and ii 118. In matrix i 116 the movement due to flow ($R_{fi}$) dominates, $R_{fi}:R_{ei}$ is greater than 1, and the net downward movement is $R_{fi} - a \cdot r \cdot 1/A \cdot Ce \cdot Me \cdot k_e$. In matrix ii 118 the movement due to electrophoresis dominates, i.e. $R_{fii}:R_{eii}$ is less than 1, and the net upward movement is $a \cdot r \cdot 1/A \cdot Ce \cdot Me \cdot k_e - R_{fii}$. As a result, the $Y^-$ ions 120 concentrate at the boundary 124 of the two matrices 116, 118 and are prevented from diffusing away because the described forces return the $Y^-$ ions 120 to the boundary 124. The only ions which will concentrate at the boundary are those for which $R_i$ (the net mobility in matrix i) is negative and $R_{ii}$ (the net mobility in matrix ii) is positive. Thus, $Y^-$ ions 120 are separated from impurities by choosing conditions such that $Y^-$ ions 120 satisfy these conditions and the impurities do not.

When the segregation of $Y^-$ ions 120 is completed, the purified $Y^-$ ions are removed from the chamber by interrupting the applied voltage, i.e. current through the chamber. As carrier fluid 110 continues to flow the zone of $Y^-$ ions 120 will move down the column and may be collected by any conventional collection means known in the art, e.g. a fraction collector which collects successive volumes of the eluting fluid in different test tubes.

FIG. 3 illustrates an alternative embodiment of the invention in which equilibrium points for a plurality of ions are extablished using a non-uniform or gradient support matrix 217, e.g. two or more different support media combined in different proportions to produce a continuously varying gradient of their separation medium characteristics. For example, two support matrices having $k_f = a$ and $2a$ may be combined to form a multiplicity of contiguous compartments producing a gradient of $k_f$ from a to 2a. The carrier fluid is then made to flow through the gradient and a sample 208 containing a mixture of different ions is added to the system. In the instant example, only those ions with electrophoresis rates ($R_e$) between $dv/dt \cdot 1/A \cdot a$ and $dv/dt \cdot 1/A \cdot 2a$ achieve equilibrium. Different ions which satisfy these boundary conditions will have equilibrium points at different locations, i.e. positions of the varying medium characteristics, in the gradient, (in different compartments), and therefore the ions separate out in different discrete zones, each at its particular equilibrium position in the gradient, i.e. in the compartment at which the dynamic equilibrium conditions for that species of ions exists.

In FIG. 3, as in FIG. 2, flow is downward and electrophoresis movement of the desired ions is upward. A sample 208 containing $S^-$ ions 212, $T^-$ ions 214, $V^-$ ions 216, $U^-$ ions 218, $Z^-$ ions 220, and $Y^-$ 222 is introduced into the separation chamber 100. A carrier solution 110 comprised of ions $A^+$ 112 and $X^-$ 113, is pumped by pump 114 through the separation chamber 100. The chamber 100 contains a gradient support matrix 217 whose characteristics are such that $S^-$, $T^-$, $V^-$, and $U^-$ ions 212, 214, 216, 218, each have equilibrium points at different locations on the gradient, while $Z^-$ and $Y^-$ ions 220, 222 do not. Thus, $S^-$, $T^-$, $V^-$ and $U^-$ ions 212, 214, 216, 218 can be collected from their respective equilibrium zones 232, 234, 236, 238, by removal through exit ports 227, 228, 229, 230. For this purpose, a plurality of pumps 252, 254, 256, 258 and the associated conduits are provided, each pump being coupled to the respective exit port. The location of the exit ports relative to each other is not important and thus they may be aligned as depicted in FIG. 2 or may be in a spiral pattern about the exteriorof the column. Also the chamber may be pre-equipped with a series of potential ports. Only those posts adjacent equilibrium zones formed are opened, either simultaneously or sequentially. The outlet of each pump 252, 254, 256 258 is coupled to appropriate downstream equipment, such as a reservoir.

In each of the embodments of the present invention, it is frequently avantageous to re-circulate, as depicted in FIG. 3, the electorolyte solutions 135, 137 present in reservoirs 134, 136 by means of a pump 204 in order to reduce any effects due to electrolysis. As depicted in FIG. 3, the process is a continuous one in that sample 208 is continuously fed into the system while concentrated $S^-$ ions 212, $T^-$ ions 214, $V^-$ ions 216, and $U^-$ ions 218 are continuously withdrawn. As will be understood by those skilled in the art, for continuous operation the rate of withdrawal of a given ion must be about equal to the rate of accumulation of that ion and each rate of withdrawal must be such as not to interfere with the equilibrium positions. In order to attain rates of withdrawal of ions which approximate the rates of accumulation, sensing means 207, 208, 209, 210, such as thermocouples, spectrophotometers, geiger counters or the like, may be utilized to detect the boundaries of the equilibrium zones 232, 234, 236, 238 and optionally to control pumps 252, 254, 256, 258, and thus the rates of withdrawal.

For example, the presence of the ions in each equilibrium zone will influence the electrical resistance of the solution in the equilibrium zone. Since the rate of heat generation, will increase as the resistance increases ($W = a^2R$ or wattage is equal to the square of the electrical current times the resistance), the temperature of the equilibrium zone will be somewhat different than that at adjacent parts of the separation chamber. Sensing means, such as thermocouples (not depicted) placed on the exterior of the column may be used to detect the temperature discontinuities in order to monitor the positions of the equilibrium zones. As the zone expands in size, the rate of withdrawal is increased and as the zone decreases in size the rate of withdrawal is decreased.

FIG. 4 depicts an embodiment of the present invention wherein a single matrix is utilized. In FIG. 4 flow is upward and electrophoretic migration is downward. Carrier fluid 110 is pumped by a pump 301 through a separation column 100 having a single matrix 310 of uniform medium characteristics. In this embodiment the matrix 310 defines compartment i and compartment ii is a free solution. In this embodiment the crude material 300 is fed into the separation chamber 100 by pump 300 via port 304. As has been the rate of movement due to electrophoresis and movement due to flow are given by equations 1 and 2, respectively. Where there is no matrix, i.e. in a compartment or volume of free flowing carrier fluid, equation 1 reduces to $$R_e = a \cdot r \cdot 1/A \cdot Me$$

and equation 2 reduces to $$R_f = dv/dt \cdot 1/A$$

This simplification amounts to no more than a special case in which the separation medium characteristics, $C_e$, $k_e$ and $k_f$, are unity. Compartment ii can be treated exactly as if it contained a matrix with these properties. Thus, in FIG. 4 of the matrix 310 is one in which at a particular ratio of $a:dv/dt$, the net mobility of the $Y^-$ ions wile negative within the matrix while it will be positive in free solution. Under these circumstances the $Y^-$ ions will migrate toward the boundry of the two compartments and, as described below, will accumulate in an equilibrium zone with one of its two boundaries coinciding with the boundary of the two compartments. Where crude material 200 containing $Y^-$ is continuously fed into the system, $Y^-$ ion 120 in a concentrated or purified form may be continuously removed from port 305 by the action of pump 307.

The Equilibrium Zone

Referring again to FIG. 1, it will be understood that the imbalances in movement due to electrophoresis and movement due to flow will cause the desired ion, $Y^-$, to move toward the boundary of the two compartments. Since the ion $Y^-$ is not normally at equilibrium in either compartment i or compartment ii, an additional factor must be involved in the formation of the equilibrium zone. The additional factor is the concentration of $Y^-$. (The movements of ions within a compartment, $R_e$ and $R_f$, have been described without consideration of the effects of the concentrations of the ions being separated. Although this represents a simplification of the real situation, throughout most of each compartment the concentrations of the ions being separated are typically too low to have a substantial impact on $R_e$ and $R_f$.) Since the ion being separated, $Y^-$, reaches a high concentration within its equilibrium zone, the rate of movement due to electrophoresis within an equilibrium zone is $R_e' = R_e \cdot f_1(c)$ and the rate of movement due to fluid flow within an equilibrium zone is $R_f' = R_e \cdot f_2(c)$ where $f_1(c)$ and $f_2(c)$ are correction factors which vary as a function of the concentration, c, of the ion forming the equilibrium zone. The correction factors $f_1(c)$ and $f_2(c)$ differ for different ions and for different combinations of separation conditions. As will be understood from the following descriptions $f_1(c)$ and $f_2(c)$ need not be known. They simply serve here as an attempt to explain the behavior of the equilibrium zone.

Consider first the following specific case. Increasing concentrations of $Y^-$ ions cause a decrease in $R_e$, e.g., $f_1(c) = 1/c$ and $R_e' = R_e \cdot 1/c$. Furthermore, the concentration of $Y^-$ ions has no influence on $R_f$. That is, $f_2(c) = 1$ and $R_f' = R_f$. Consider that for $Y^-$ ions, $R_n = R_e - R_f$ is positive in compartment i ($R_i > 0$) and negative in compartment ii ($R_{ii} < 0$) and that compartment ii is on the electrophoresis side of compartment i, i.e. contiguous to compartment i in the direction of electrophoresis. Under these conditions the equilibrium zone is thought to form and behave as follows. Ion $Y^-$ accumulates at the boundary of the two compartments and the increasing concentration of $Y^-$ results in a decreased movement due to electrophoresis. When $R_e'$ is reduced to the point where it equals $R_f$ in compartment i, the equilibrium zone has been established. If the concentration increases further the movement due to flow dominates and $Y^-$ moves into compartment i, thereby decreasing the concentration of $Y^-$, increasing the size of the zone and reestablishing the equilibrium situation. If the concentration of $Y^-$ were to decrease, $R_e'$ would increase and thus movement due to electrophoresis would dominate which would cause the $Y^-$ ions to move toward the boundary of compartments i and ii, and once again increase the concentration of $Y^-$ ions and reestablish the equilibrium situation. Thus, it is clear that the equilibrium zone is self-regulating and the ion, $Y^-$, composing that zone is maintained at just that concentration which causes $R_e'$ to counterbalance $R_f'$. When additional $Y^-$ ions are added to the zone, the zone will increase in size and similarly the removal of $Y^-$ ions from the zone will cause it to decrease in size. In this partiuclar case the equilibrium zone will form in compartment i. One boundary of the equilibrium zone will correspond to the boundary of compartments i and ii, and the other boundary of the zone will be within compartment i (its position being determined by the total amount of $Y^-$ which has accumulated in the equilibrium zone).

It should be emphasized that these conditions establish themselves automatically and that an equilibrium zone will be established irrespective of the values of $f_1(c)$ and $f_2(c)$. However, the positionof the equilibrium zone will depend on the values of $f_1(c)$ and $f_2(c)$. Although for the instant example one of the boundaries of the equilibrium zone will always correspond with the boundary of compartments i and ii, the other boundary of the equilibrium zone may lie in either compartment i or ii depending on the values of $f_1(c)$ and $f_2(c)$. Consider the following cases wherein for ion $Y^-$, $R_n = R_e - R_f$ is positive in compartment i ($R_i > 0$) and negative in compartment ii ($R_{ii} > 0$) and that compartment ii is on the electrophoresis side of compartment i.

Case 1: If increasing concentration of $Y^-$ causes $R_e'$ to increae, then when a certain concentration is reached $R_{ii}$ will become zero. That is, normally $R_{ii} = R_{eii} - R_{fii}$, whereas within an equilibrium zone lying in compartment ii $R_{ii}' = R_e'$ and in this case $R_f' = R_{fii}$. Thus, if $R_e' = R_{fii}$ then within the equilibrium zone $R_{ii}' = R_e' - R_{fii} = 0$. This condition develops because $R_{eii} > R_{fii}$ and the increasing concentration of $Y^-$ ions cause $R_e'$ to increase until it equals $R_{fii}$. In contrast, in this particular case $R_i$ cannot become zero because $R_{ei} > R_{fi}$ and increasing the concentration of $Y^-$ ions would only increase $R_i$. Thus, under these conditions the equilibrium zone forms in compartment ii and one boundary corresponds to the common boundry of compartment i and compartment ii.

Case 2. If increasing concentration of $Y^-$ causes $R_f'$ to increase, then when a certain concentration is reached $R_i$ will become zero. Note that in this case $R_{ii}$ cannot become zero but rather becomes more negative. Thus the equilibrium zone will form adjacent to compartment ii but within compartment i.

Case 3: If increasing concentration causes $R_f'$ to decrease, then when a certain concentration is reached $R_{ii}$ will become zero and $R_i$ cannot become zero. The equilibrium zone will form adjacent to compartment i but within compartment ii.

More complicated cases which can exist are those wherein both $R_e$ and $R_f$ are affected, $R_{ei}$ and $R_{eii}$ are affected differently, $R_{fi}$ and $R_{fii}$ are affected differently, or combinations thereof. As will be apparent to those skilled in the art, a quasi equilibrium can be reached in all cases and the concentration of a species in the equilibrium zone will be determined by the separation system characteristics.

As will be apparent to one skilled in the art, a number of different factors could be involved in the influence of concentration on $R_e$ and $R_f$. For example, the ion, $Y^-$, forming an equilibrium zone may alter the electrical conductivity of the equilibrium zone, and thereby influence its own mobility. Alternately, $Y^-$ ions might interact with biospecific sites on one of the matrices, and the high concentration of $Y^-$ ions in the equilibrium zone might saturate these sites and alter both $R_e'$ and $R_f'$.

When more than one species of ions satisfies the boundary conditions, $R_i > 0$ and $R_{ii} < 0$, (as depicted in FIG. 5), all such ions are forced toward the boundary of the two matrices. However, each of the different ion species will typically form a separate or discrete equilibrium zone. This follows from the above described considerations and can be understood as follows. Consider a system in which one ion, $Y^-$, has formed an equilibrium zone where one boundary of the zone coincides with the boundaries of matrices i and ii which form the compartments of the separation system (e.g. $Y^-$ ions in FIG. 5). Furthermore, in the instant example, matrix ii (416 in FIG. 5) is on the electrophoresis side of matrix i (418 in FIG. 5) and according to principles described $R_i > 0$ and $R_{ii} > 0$ for ion $Y^-$ whose equilibrium zone lies in matrix i. If a second ion $V^-$ is introduced into this separation system and if this ion also satisfies the boundary conditions, $R_i > 0$ and $R_{ii} > 0$, then it will be forced toward the boundaries of compartments i and ii. However, the net rate of movement of ion $V^-$ will typically be affected by the high concentration of ion $Y^-$ in the existing equilibrium zone. Thus, assume the net rate of movement of ion $V^-$ within the equilibrium zone of $Y^-$ (designated $R_n'$) is less than 0. Thus, $R_i > 0$ while $R_n'$ and $R_{ii}$ are less than zero and $V^-$ would concentrate at the boundary of the equilibrium zone for $Y^-$ ions and the remainder of compartment i. Following the principles described above, ion $V^-$ would then form its own equilibrium zone in this position (FIG. 5). Similarly, if a third ion species, $Z^-$, were introduced into the separation system, it would typically form a third discrete equilibrium zone if it satisfies the boundary conditions, $R_i > 0$ and $R_{ii} < 0$. Additionally, if the net rate of movement of Z ions within the equilibrium zone of $Y^-$, $R_n'$, is less than zero and similarly the net rate of movement of $Z^-$ ions within the equilibrium zone of $V^-$, $R_n''$, is also less than zero, then $Z^-$ ions will form an equilibrium zone between the equilibrium zone of $V^-$ ions and the remainder of compartment i (FIG. 5). That is, since $R_{ii}$, $R_n'$ and $R_n'' < 0$, $V^-$ ions will migrate in the direction of flow whereas since $R_i > 0$ it will migrate in the direction of electrophoresis in compartment i and thus be forced to this equilibrium position. To one skilled in the art it will be obvious that this condition of multiple discrete boundaries will form automatically and does not require that the different ions species be introduced sequentially.

Referring again to FIG. 5, crude material 400 containing $Y^-$ ions 420 to be purified is fed into the separation chamber 410 with the flowing carrier fluid 440. Port(s) 402 are attached to the separation column just below the boundry 424 of the two matrices 416, 418 (below assuming that the equilibrium zone will form in the lower compartment; under other conditions the port would be positioned above the boundary) and both fluid 440 and the purified $Y^-$ ions 420 can be withdrawn from the equilibrium zone 450, provided only that the following requirements are satisfied: (a) either the $Y^-$ ion 420 of interest must be the only component which comes to equilibrium in the separation system or if several ions, i.e. $Y^-$ ions 420, $V^-$ ions 419, and $Z^-$ ions 431, come to equilibrium, $Y^-$ ions 420 must form the first equilibrium zone (the one bordering on the boundary 424 of the two matrices 416, 418) so that the position of this zone will not change with time or if the ion of interest forms an equilibrium zone whose boundary is defined by another equilibrium zone, i.e. $V^-$ ions 419, $X^-$ ions must be withdrawn at a rate corresponding to their rate of accumulation so that the position of the equilibrium zone of the desired ion remains constant; and (b) the rate of carrier fluid 440 withdrawal from the port 402 must not perturb the fluid flow 440 through the separation chamber 100 to an extent which would destroy the equilibrium force. Furthermore, the rate of withdrawal of material at the port 402 must substantially match the rate of accumulation of the desired $Y^-$ ion 420 in the equilibrium zone 450 if maximum purification and recovery are required (this can easily be accomplished since the zone 450 can be detected by one or more sensing means 480 which regulates the withdrawal from the ports by control of the withdrawing pump 482).

Lateral Movement

Another embodiment of the present invention depicted in FIGS. 6, 7 and 8 provides for, and is particularly useful in those applications which require high purification factors. In this design, the flow force (and thus the movement of the desired ions due to flow) and the electrophoretic force (and thus the movement due to electrophoresis) do not directly oppose each other but are at an oblique angle relative to each other. This is shown schematically in FIG. 6, where the direction of the electric field 502 is at an angle, $\theta$, to the direction of fluid flow 500. The electric field of magnitude V can be considered to be composed of two vectors. One of these would have a magnitude of $\cos \theta \cdot V$ and would directly oppose the movement due to fluid flow and the other vector would have a magnitude of $\sin \theta \cdot V$ and would act in the direction at right angles to the direction of fluid flow. If the rates of net movement, $R_i$ and $R_{ii}$, in the two compartments 521, 522 are only considered in the direction parallel to the direction of fluid flow, then the only relevant voltage field is that which is in parallel with this direction of flow. An appropriate electric force, V, would generate a value of $\cos \theta \cdot V$ such that for a particular ion species, $Y^-$, $R_i < 0$ and $R_{ii} > 0$. Thus, $Y^-$ ions will be forced toward the boundry of the two compartments 521, 522 and will form an equilibrium zone 506.

Atlthough $Y^-$ ions in the equilibrium zone will have no substantial movement in the direction defined by the direction of fluid flow, these ions will be influenced by the other vector of the electric field, $\sin \theta \cdot V$, and will migrate laterally from the position of the inlet port 504 to the position of the outlet port 508. In order to avoid distortions in the electric field or the pattern of fluid flow, this design incorporates a wedge 510 on each side of the separation chamber composed of a third matrix which resists fluid flow but which allows ions to move under the influence of a voltage gradient.

FIGS. 7 and 8 illustrate one embodiment of an apparatus for combining lateral movement and dynamic equilibrium electrophoresis. Carrier fluid enters through an entry trough 705 and flows through a separation chamber having longitudinally varying medium characteristics exiting through an exit trough 707. The crude material is fed in on one side of the separation chamber 701 at the entry port 703 and an equilibrium zone 706 is formed at the boundary 724 of the two matrices, matrix i 721 and matrix ii 722. However, the ions move laterally along the equilibrium zone 706 because the movements of the ion due to electrophoresis and flow cancel out only along the longitudinal direction or axis and a residual lateral force remains along the other lateral axis. Thus, the purified material can be collected from an exit port 708 at the boundary 724 of the two matrices but positioned on the side of separation chamber opposite the input port 703. Typically a third matrix iii 710 or other material which resists fluid flow but which allows ions to move under the influence of a voltage gradient will be positioned along the lateral sides of the separation chamber. In this embodiment electrodes 731, 732 are placed in long electrode reservoirs 733, 734 which are parallel with each other but at an angle to the entry and exit troughs 705, 707. The electrode reservoirs 733, 734 are connected to the separation chamber 701 by membranes 735, 736 which resist fluid flow but allow elastic current to pass.

FIG. 8 is a cross-sectional view of the apparatus of FIG. 7 taken along line 8—8.

In all of the embodiments described above, the longitudinal variation in separation characteristics is produced by the presence of one or more matrices. In an alternate embodiment described here, the concentration of the carrier fluid ions varies longitudinally resulting in a a longitudinal variation in the resistance of the fluid to electrical current and thus producing a longitudinal variation in electric force affecting the ions. As can be seen from equation 1, the rate of movement due to electrophoresis, $R_e$, varies in direct proportion to a change in the electrical resistance of the carrier fluid, r. Since $R_f$ is unaffected by r (equation 2) the production of a continuous gradient of r along the longitudinal dimension of a separation chamber will produce a multiplicity of compartments with differing ratios of $R_e/R_f$. As described above, these are the conditions needed for dynamic equilibrium electrophoresis. An increase in the concentration of ions causes a decrease in the electrical resistance of a fluid. The embodiment shown in FIG. 9 is illustrative of methods which can be used to generate such a gradient of ion concentration. A second chamber 901 whose walls are constructed of a semipermeable membrane, i.e., a material which resists bulk fluid flow and restricts the passage of the desired $Y^-$ ion, but allows the carrier ions $A^+$ and $X^-$ to freely diffuse across (e.g. cellulose dialysis membrane) is enclosed within the separation chamber 900. Pump 902 pumps a dilute solution of $A^+X^-$ through the inner chamber 901 and pump 903 pumps a concentrated solution of $A^+X^-$ through the separation chamber such that the direction of flow in the separation chamber 900 is counter to the direction of flow in the inner chamber 901. Under these conditions $A^+X^-$ will diffuse from the separation chamber 900 into the inner chamber 901 so that the concentration of $A^+X^-$ in the carrier fluid will increase as the carrier fluid passes through the inner chamber 901. Of course the concentration of $A^+X^-$ in the carrier fluid will decrease as it passes through the separation chamber 900. Because of the high concentration of $A^+X$ and thus the low electrical resistance of the carrier fluid when it enters the separation chamber, $R_e$ for ion $Y^-$ will be low and $R_f$ will dominate so that net movement will be in the direction of flow. However, as $Y^-$ moves up the separation chamber, r increases as does $R_e$ and under the appropriate conditions $R_e$ will reach a value which counterbalances $R_f$ and an equilibrium zone 910 will form. Note that the electrode reservoir 136 connected to the end of the separation chamber containing a high concentration of $A^+X^-$ will be filled with a carrier solution containing the high concentration of $A^+X^-$ while the electrode reservoir 134 attached to the end of the separation chamber containing the low concentration of $A^+X^-$ will be filled with the carrier solution containing the low concentration of $A^+X^-$. It should be further noted that this embodiment requires that rates of flow are sufficiently low to allow the concentration of $A^+X^-$ to approach equilibrium across the walls of the inner chamber 901. The rate of diffusion of $A^+X^-$ across this wall is likely to limit the practicality of large scale apparati of this particular type. It should be possible to circumvent this limitation by substituting the inner chamber 901 with a multitude of small chambers. The construction of chambers of this type is a known art, e.g. the Diaflo hollow fiber units made by Amicon.

In another embodiment of the present invention, unequal flow rates in different compartments of the separation chamber provide the longitudinal variation in separation characteristics. FIG. 10 illustrates one such embodiment. A carrier fluid containing carrier ions 112, 113 as well as the desired ion species, $Y^-$, is pumped through the separation chamber which can be filled with a matrix whose only importance is anticonvection, e.g. the influence of this matrix on $R_e$ and $R_f$ is not relevant to operation in this mode. Pump 1082 pumps carrier fluid containing the desired ion out of the separation chamber and returns it to the inlet of the separation chamber. Because of the operation of pump 1082 the rate of carrier fluid flow in compartment 1012 is lower than the rate of fluid flow in compartment 1011. Under the appropriate operating conditions $R_e/R_f > 1$ in compartment 1012 and $R_e/R_f < 1$ in compartment 1011. Thus, the desired ion would collect at an equilibrium zone which typically will form adjacent to the exit port 1020 serving the pump 1082. The desired ion $Y^-$ can be collected by another exit port 1021 by the action of pump 1083 or alternate methods described above could be used for collection. Because the action of pump 1082 tends to distort the path of fluid flow, this embodiment works most effectively with a layered matrix which partly resists fluid flow in the longitudinal dimension but gives little resistance to lateral fluid flow (i.e. where a large pressure differential is required to drive the fluid longitudinally through the separation chamber).

For purposes of any of the embodiments of the present invention any one of a large number of commercially available electrical power sources 122 having a stable direct current output can be used. The voltage V applied to the system is chosen as dictated by separation requirements. That is, the voltage gradient dV/dD is directly proportional to the applied voltage or applied current. Thus, by equation 1, the movement due to electrophoresis is proportional to the input voltage or input current. Means for applying the voltage are those known in the art, such as those described in U.S. Pat. No. 3,737,758.

A wide range of support matrices has been developed for use in liquid chromatographic procedures. These same matrices can be used in the procedures of the present invention. Virtually all of these matrices may have a different effect on the movement of ions due to flow than they have on the movement due to electrophoresis of the same ions and will therefore be useful in the process of the present invention. Because of the variety of such matrices, and the variety of their modes or interaction with particular ions, it is possible, as will be known and understood by those skilled in the art, to separate ions on the basis of virtually any chemical/physical property (e.g., molecular size, ionic character, hydrophobicity, and electrophoretic mobility), by selecting the right matrices. Typical of such matrices are polyacrylamide gels, cellulose, agarose, copolymers of acrylic and methacrylic acids and the like, with or without charged functionalities such as diethyl amino ethyl (DEAE) and carboxy methyl (CM).

Other embodiments of the present invention relate to continuous purification or enrichment processes suited to industrial scale applications. By a continuous flow process is meant a process in which the impure raw material is fed into the system continuously and the purified product is removed continuously. In carrying out the present method, a number of alternative configurations and processes are available. General designs by which the process of the present invention can be used as a continuous flow process are as shown in FIGS. 3-8 and 10.

SPECIFIC APPLICATIONS

(1) Protein purification

The process of the present invention was utilized for its capacity to resolve proteins. The high resolution of the system allowed for separation of proteins which differ by less than 1% in their electrophoretic mobility or degree of interaction with the gel permeation matrices used in the separation chamber. Other matrices such as ion exchange resins, hydrophobic affinity resins, absorption resins, and specific affinity resins, can also be used. The number of adjustable parameters are sufficient to allow the procedure to be used for the purification of nucleic acids, proteins, antibodies, antigens, haptens, and hormones, e.g. the purification of interferon, useful for treatment of viral diseases and the isolation of peptide hormones.

(2) Purification of antibiotics

Most antibiotics contain a number of amino acids in their structures and can be anticipated to behave somewhat like very small proteins in the described separation procedure. Thus, the process is useful for drug purification and provides an economical method for purifying antibiotics which are made in low amounts and/or are difficult to separate from contaminants.

Separation of colored protein, ferritin, was carried out utilizing a carrier buffer solution of 10 mM Tris Acetate, pH 7.4, a 50 cm long vertical glass column with an internal diameter of 7 mm as a separation chamber and commercial gel permeation matrices (agarose A 50 m and Biogel P-10 available from Bio-Rad Laboratories, Richmond, California). Matrix i, the Biogel P-10, was layered above a zone of matrix ii, the agarose A 50 m. The flow direction was downward while the electrophoresis direction was upward (since the protein, ferritin, is negatively charged, the positive electrode was at the top of the columm in order to impart an upward electrophoretic motion to the protein). Equilibrium was obtained at an applied voltage of 600 V and a flow rate of 40 ml/hr. Under these conditions, 10 mg of added ferritin was concentrated into a narrow band about 2 mm wide. The protein zone remained stable in this position, but as expected, small adjustments of the applied voltage or flow caused the protein to be displaced from the equilibrium position.

Resolution was tested by first determining whether the ferritin could be separated from other colored proteins. Secondly, the smallest change in applied voltage which would shift the position of myoglobin in the separation chamber was determined. A high resolution of separation between ferritin and other proteins was observed. In fact, hemoglobin, myoglobin, and cytochrome c, would not achieve equilibrium under the same conditions as those which forced ferritin to an equilibrium position. As a result, the other proteins ran off the column. However, using other voltage and flow settings, equilibrium conditions for these other proteins were defined. To give a measure of degree of resolution of these proteins, the equilibrium conditions for each protein are compared. Since both flow and applied voltage are adjusted to achieve these equilibrium conditions, and it is their ratio which defines the equilibrium conditions, the ratios for different proteins provide a comparison. In arbitrary units, the equilibrium ratios were ferritin 6.7, hemoglobin 32, and myoglobin 56 (the cytochrome c required an alteration in electrical polarity). Ferritin was brought to equilibrium between a boundary between two matrices (matrix i, Biogel P-300; matrix ii, mixture consisting of 80% Biogel P-300 and 20% Agarose A 5 m) and the applied voltage was changed until the protein shifted from equilibrium. The minimal voltage change required to shift the ferritin corresponded to a change in the equilibrium ratio of 3%. On the basis of these measurements, it can be seen that the process of the present invention equals or surpasses other known separation procedures in terms of resolution of proteins. Furthermore, even the small scale apparatus utilized herein has a capacity approaching 1 gm of purified protein, which equals or exceeds the capacity of other known methods of separation.

While various embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

I claim:

1. A method of segregating at least one species of desired ions in a separation chamber having longitudinally varying separation characteristics comprising the steps of:

introducing said ions into said chamber;

imparting said ions with a movement in a first direction by flowing a carrier fluid through said chamber; and applying an electric field across said chanber to simultaneously electrophorese said ions in a second direction counter to said first direction to segregate each of said species in an equilibrium zone within the chamber.

2. A method according to claim 1 further comprising the step of removing one or more of said species from the equilibrium zone of said species.

3. A method according to claim 1 further comprising providing in said chamber a gradient matrix having continuously varying medium characteristics.

4. A method according to claim 1 further comprising providing in said chamber at least two contiguous matrices whereby at least one of said equilibrium zones will abut the common boundary of said matrices.

5. A method according to claim 1 further comprising providing in said chamber at least one matrix of uniform medium characteristics contiguous to a volume of free flowing carrier fluid whereby at least one of said equilibrium zones will abut the common boundary of said matrix and said volume.

6. A method according to claim 1 further comprising providing in said chamber compartments having carrier fluid of differing electrical resistances.

7. A method according to claim 1 further comprising providing in said chamber carrier fluid having a gradient of electrical resistance.

8. A method according to claim 1 further comprising providing in said chamber compartments with differing rates of movement of said flowing carrier fluid.

9. A method according to claim 2 wherein said step of removing is continuous.

10. A method according to claim 9 wherein said step of introducing is continuous.

11. A method according to claim 1 further comprising the steps of
terminating said step of applying after each of said species is segregated;
allowing said species to move through said chamber due to said flowing carrier fluid; and
collecting said species by collecting means.

12. A method according to claim 1 further comprising the step of detecting said zones by detection means.

13. A method according to claim 1 wherein said second direction is at an acute angle to said first direction whereby said equilibrium zones have lateral movement.

14. A method according to claim 13 further comprising the step of removing said species from a port disposed adjacent said at least one equilibrium zone in the direction of said lateral movement.

15. A method according to claim 14 wherein said steps of introducing and removing are continuous.

16. A method according to claim 2 wherein said steps of introducing and removing are intermittent.

17. A method according to claim 3, 4 or 5 wherein said matrix retards ions in relation to their size.

18. A method according to claim 3, 4 or 5 wherein said matrix has ionic interactions with ions.

19. A method according to claim 3, 4 or 5 wherein said matrix is a specific affinity resin.

20. A method according to claim 3, 4 o4 5 wherein said matrix is an adsorption resin.

21. A method according to claim 6 or 7 wherein said differences in electrical resistance are due to differences in concentrations of ions produced by diffusion of ions across a semipermeable membrane.

22. A method according to claim 1 wherein said at least one species is a protein.

23. A method according to claim 1 wherein said at least one species is selected from the group of antibody, antigen and hapten.

24. A method according to claim 1 wherein said at least one species is an antibiotic.

25. A method according to claim 22 wherein a plurality of proteins are segregated from each other.

26. A method according to claim 1 wherein said at least one species is a nucleic acid.

* * * * *

UNITED STATES PATENT AND TRADEMARK OFFICE
CERTIFICATE OF CORRECTION

PATENT NO. : 4,323,439
DATED : April 6, 1982
INVENTOR(S) : Patrick H. O'Farrell

It is certified that error appears in the above—identified patent and that said Letters Patent is hereby corrected as shown below:

In the above patent please make the following corrections.

In column 8, line 18, change "exteriorof" to --exterior of--.

In column 8, line 25, change "embodments" to --embodiments--.

In column 9, line 18, change "wile" to --will be--.

In column 10, line 33, change "positionof" to --position of--.

In column 13, line 40, change "a a longitudinal" to --a longitudinal--.

Signed and Sealed this

Nineteenth Day of October 1982

[SEAL]

Attest:

GERALD J. MOSSINGHOFF

Attesting Officer

Commissioner of Patents and Trademarks